United States Patent [19]
Meacher et al.

[11] Patent Number: 5,858,569
[45] Date of Patent: Jan. 12, 1999

[54] LOW COST FUEL CELL STACK DESIGN

[75] Inventors: John Meacher, Ballston Lake; Nicholas G. Vitale, Watervliet, both of N.Y.

[73] Assignee: Plug Power L.L.C., Latham, N.Y.

[21] Appl. No.: 821,513

[22] Filed: Mar. 21, 1997

[51] Int. Cl.⁶ ..................................................... H01M 8/04
[52] U.S. Cl. .................. 429/26; 429/32; 429/39
[58] Field of Search ................................ 429/26, 32, 38, 429/39

[56] References Cited

U.S. PATENT DOCUMENTS

| | | | |
|---|---|---|---|
| 5,049,459 | 9/1991 | Akagi | 429/38 X |
| 5,262,249 | 11/1993 | Beal et al. | 429/26 |
| 5,300,370 | 4/1994 | Washington et al. | 429/38 X |
| 5,683,828 | 11/1997 | Spear et al. | 429/26 X |

*Primary Examiner*—Stephen Kalafut
*Attorney, Agent, or Firm*—Kane, Dalsimer, Sullivan, Kurucz, Levy, Eisele and Richard, LLP

[57] ABSTRACT

The fuel cell stack includes sequential fuel cell membrane elements of polymer membrane with a cathode side and an anode side. The polymer membrane is held in place by an elastomeric gasket which includes flow channels leading to manifold passages which deliver hydrogen or other fuel gas to the anode side of the fuel cell membrane element and deliver air or oxygen to the cathode side of the fuel cell membrane assembly. The fuel cells are separated by fuel separator assemblies comprised of metallic foil with strips of porous graphite thereon. Cooling plates which receive cooling water are interspersed within the stack. The entire stack is held in place by a plastic resin shell. The various elements are compressed together by an upper platen with a limited range of travel which is urged toward the cell by air pressure, an air-filled bladder, an array of compression springs, or by similar methods.

7 Claims, 8 Drawing Sheets

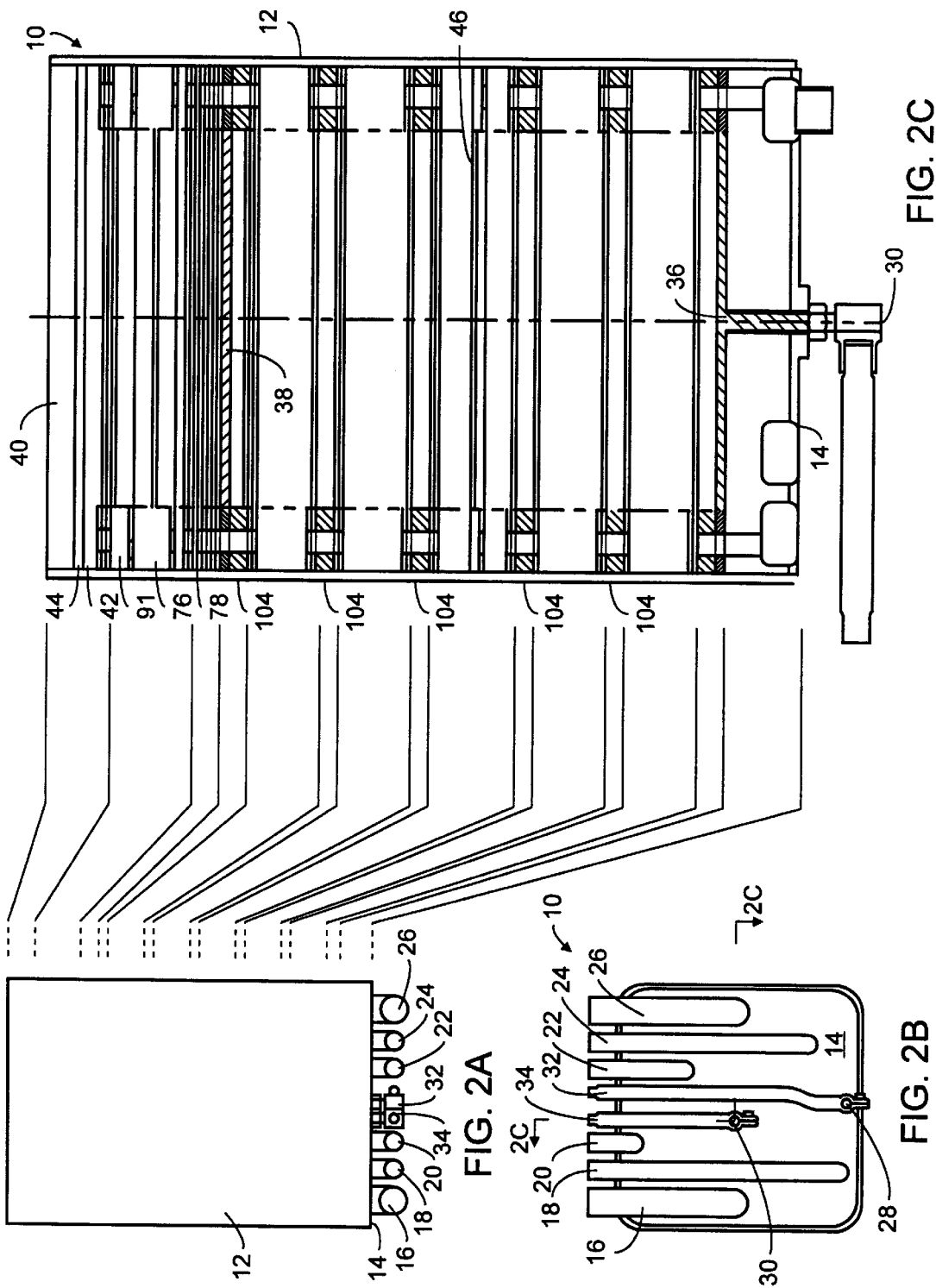

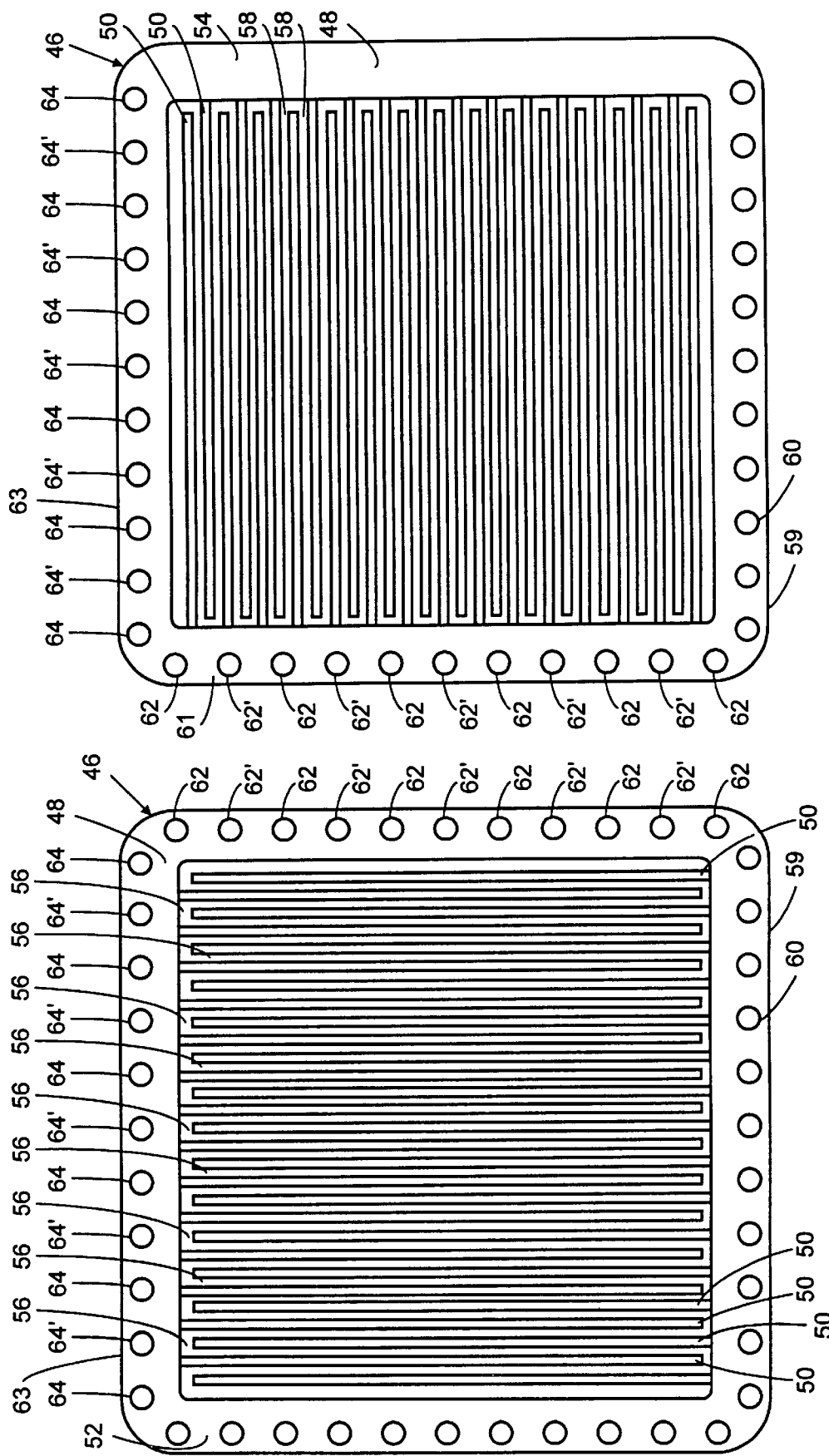

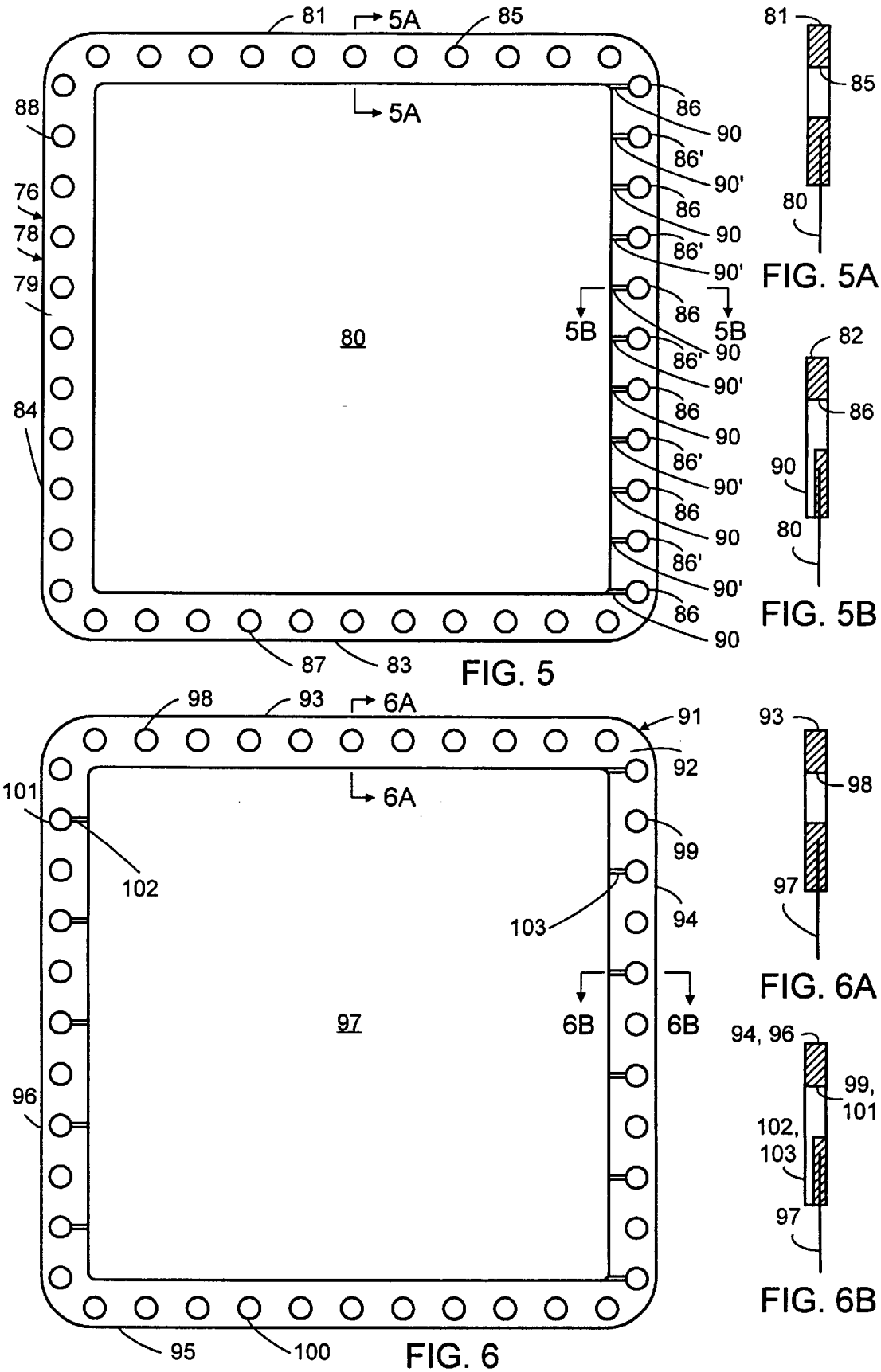

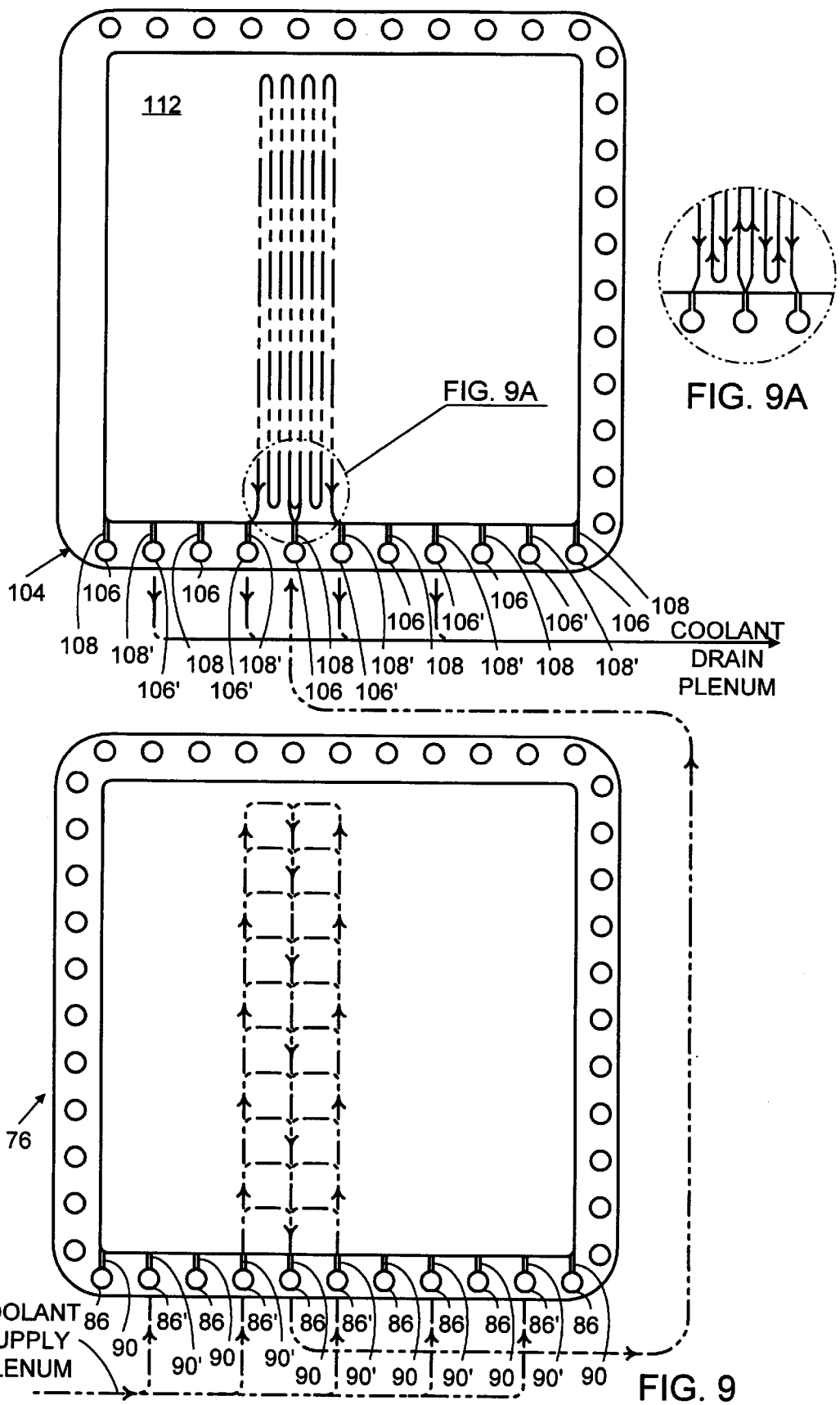

LOW COST FUEL CELL STACK DESIGN

BACKGROUND OF THE INVENTION

1. Field of the Invention

The invention pertains to fuel cells with a polymer electrolyte, also known as the proton-exchange-membrane type. More particularly, the invention pertains to a polymer electrolyte fuel cell which includes an injection molded external housing.

2. Description of the Prior Art

In the prior art, fuel cells have been categorized into five types according to the nature of the electrolyte employed in the cell, namely, alkaline, phosphoric acid, molten carbonate, solid oxide and polymer electrolyte. The present invention pertains to polymer electrolyte fuel cells, also known as the proton-exchange-membrane (PEM) type. In the PEM cell, the electrolyte is comprised of a thin membrane made of a polymer similar to polytetrafluoroethylene (PTFE or Teflon®) with sulfonic acid groups included in the polymer molecular structure. The sulfonic acid groups are acid ions which are the active electrolyte. The membrane has the dual attributes of readily conducting hydrogen nuclei ($H^+$ ions or protons) from one face through the thickness of the membrane to the opposite face while effectively blocking the flow of diatomic hydrogen molecules through the membrane. Thus, if a chemical reaction can be made to occur on one face whereby diatomic hydrogen gas ($H_2$) can be reduced to protons ($2H^+$) and electrons, the protons flow through the membrane, while the electrons can be passed through an external electrical conductor. Then, if a second reaction which oxidizes the protons can be made to occur on the opposite face, a continuous flow of protons across the membrane, and of electrons through the external conductor occurs thereby producing electrical current. In the PEM fuel cell, the two reactions are:

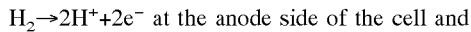
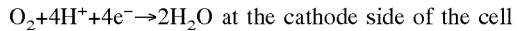

$H_2 \rightarrow 2H^+ + 2e^-$ at the anode side of the cell and $O_2 + 4H^+ + 4e^- \rightarrow 2H_2O$ at the cathode side of the cell In order that such a membrane performs as a fuel cell and produces electric current in an effective manner, several functional requirements must be satisfied, to wit:

1. Hydrogen gas must be distributed uniformly over the active area of the anode side of the membrane.
2. Oxygen or air must be distributed uniformly over the cathode side of the membrane.
3. The membrane must be kept moist to a controlled degree.
4. A catalyst must be uniformly dispersed over the active area on both sides of the membrane in such a manner that each catalyst-particle site is concurrently accessible to the reactant gas, the polymer electrolyte material, and to a third material which forms an electrically conductive path.
5. A means must be provided to collect the electron flow (electrical current) over the entire area of the membrane, and ensure an uninterrupted electrically conductive flow path from the catalyzed surfaces of the membrane to these current-collector devices.
6. The channels or chambers containing the reactant gas must be sealed from one another and from the ambient atmosphere, to prevent both wasteful loss of the gases and potentially dangerous mixing of the reactants inside the cell.

Single cells produce voltage in the range of 0.4 to 0.8 volts. Practical applications require that multiple cells be assembled to be in series electrically, enabling the delivery of current at voltages from 6 to 120 volts. Such assemblies are referred to as "stacks" and the cells are sequentially physically stacked and clamped together.

FIGS. 1A and 1B show a representative construction of a PEM fuel-cell stack 200 of the prior art which is comprised generally of successive planar elements as described hereinbelow. The exterior of the fuel-cell stack 200 is formed from upper steel clamping plate 201 and lower steel clamping plate 230, with electrically insulating layers 202, 221, respectively, inwardly adjacent therefrom. Similarly, copper current collection plates 203, 222 are inwardly adjacent from the electrically insulating layers 202, 221, respectively, and graphite anode plate 204 and graphite cathode plate 223 are inwardly adjacent from copper current collection plates 203, 222, respectively. The graphite anode plate 204 includes serpentine machined hydrogen distribution grooves 208 (shown in cross section) which are oriented inwardly to be exposed to carbon-cloth gas diffusion anode layer 205 to distribute hydrogen gas over the active area of the top cell formed from carbon-cloth gas diffusion anode and cathode layers 205, 205' surrounding polymer membrane 206. Serpentine machined hydrogen distribution grooves 208 receive hydrogen via horizontal spur passages 211 from gas supply manifold passage 210 which is an aperture extending downwardly through the various planar elements.

Similarly, graphite cathode plate 223 includes serpentine machined air distribution grooves 229 (shown in cross section) which are oriented inwardly to be exposed to cathode carbon-cloth gas diffusion layer 224. Serpentine machined air distribution grooves 229 receive air from an air supply manifold passage and associated passages (not shown) similar in construction to gas supply manifold passage 210.

Polymer membranes 206, 225 and carbon-cloth gas diffusion cathode and anode layers 205', 226 are successively inwardly adjacent from carbon-cloth gas diffusion layers 205, 224, respectively. Sealing gaskets 214 seal the periphery of the various carbon-cloth gas diffusion layers.

The interior of the fuel cell stack 200 includes alternating layers of graphite bipolar plates 207 (which include serpentine machined air distribution grooves 209 similar to elements 229 and serpentine machined gas distribution grooves 213 in fluid communication with spur passage 212, similar to elements 208, 211, respectively) and intermediate cells formed from polymer membrane 220 (similar to polymer membrane 206) surrounded by carbon-cloth diffusion anode and cathode layers 219, 219' (similar to 205, 205').

Carbon-cloth gas diffusion layers 205, 205', 219, 219', 224, 226 provide gas diffusion layers between the grooved surfaces of plates 204, 207, 223 and the polymer membranes 206, 220, 225 and are composed of a cloth woven of carbon fibers, with a slurry of lampblack and a small portion of polytetrafluoroethylene (PTFE or Teflon®) impressed and sintered into the interstices of the fabric. Each polymer membrane thereby resides between cushioning "blankets" of carbon cloth infused with carbon and PTFE particles, in turn clamped between grooved, graphite plates. The catalyst, usually platinum, is applied as a slurry or paste of platinum-black and lampblack in a dilute solution of the polymer of which the membrane is comprised. Two different approaches have evolved with regard to the catalyst, the gas-diffusion cloth and the membrane. In the first approach, the catalyst is included in the slurry applied to the surface of the gas-diffusion cloth and the membrane. The two cloth layers are then placed next to the membrane, one on each side, and this three-layer sandwich is hot-pressed together. The polymer component of the slurry bonds to the membrane, uniting the three layers to form an integral structure called the membrane-electrode assembly (MEA). The second approach employs an ink comprised of minute particles of platinum supported on lampblack particles, suspended in a solution of the polymer material. The ink-slurry is applied to both surfaces of the membrane, which is then hot-pressed to bond the ink onto the membrane. The polymer component of the ink intimately bonds to the polymer material of the membrane. The ink-coated membrane is referred to as the MEA in this approach. A layer of un-catalyzed gas diffusion cloth is then placed adjacent to each side of the membrane when the cell is assembled. In this approach, the catalyzed membranes must be accurately located and assembled into the stack structure as an unsupported, thin material.

The gas diffusion layer serves four purposes:
1. It allows reactant gas to diffuse under the graphite plates between the grooves, enabling the inter-groove areas of the membrane to become active and generate current.
2. It forms the electrically conducting path for current generated in the groove regions of the cell to flow laterally to areas where the contacting portions of the graphite plates can conduct it perpendicularly through the stack.
3. It acts as an electrically conducting material between the current-producing, catalyzed sites on the membrane and the graphite plates, resiliently conforming to surface irregularities and improving the electrical contact between these members.
4. It bridges across the grooves in the graphite plates, providing some structure support for the membrane. The membrane is a thin, somewhat fragile material, ranging from 0.0008 to 0.007 inches in thickness.

Near both the top and the bottom of the stack are current-collector plates 203, 222, typically made of copper, which collect the current produced over the entire area of the cells. Protruding tabs (not shown) on these plates are connection points for external electrical conductors. At the top and bottom of the stack are rigid clamping plates 201, 230, usually made of steel or aluminum, with apertures 217, 218 through which tie bolts 215 are passed and secured with nuts 216. These members are used to apply a compressive pressure on the order of 120 psi to clamp the stack components together. This is necessary to obtain good electrical connection between all the components over the entire active area of the cells. These clamping plates 201, 230 and inter-connecting tie rod(s) 215 must be electrically insulated from the current-collector plates 203, 222, or the stack 200 will be short-circuited through the tie rod(s) 215. Therefore, electrically insulating layers 202, 221 are interposed between the current-collector plates 203, 222 and the clamping plates 201, 230.

However, the prior art configuration shown in FIGS. 1A and 1B is less than desirable due to its high weight, cost and volume per kilowatt due primarily to the machined graphite plates, the clamping plates and tie bolts. Additionally, sealing between the stacked components has been difficult, both around the perimeter of the cells, and around manifold passages internal to the stack. The polymer membrane has been difficult to handle and position during assembly, as it is merely a thin, unsupported material having rigidity comparable to common plastic wrap.

OBJECTS AND SUMMARY OF THE INVENTION

It is therefore an object of the present invention to provide a proton-exchange-membrane (PEM) fuel cell with a reduced weight as compared to prior art PEM fuel cells.

It is therefore a further object of the present invention to provide a PEM fuel cell with a reduced cost as compared to prior art PEM fuel cells.

It is therefore a still further object of the present invention to provide a PEM fuel cell with a reduced volume per kilowatt of capacity.

It is therefore a still further object of the present invention to provide a PEM fuel cell with a reduced or eliminated requirement of large, heavy machined graphite plates, clamping plates and tie bolts.

It is therefore a still further object of the present invention to provide a PEM fuel cell with simple sealing around the various components and the gas manifolds.

It is therefore a still further object of the present invention to reduce or eliminate the problems associated with thin, flexible, unsupported polymer membranes in a PEM fuel cell.

The present invention replaces the machined graphite plate for distribution of gas over the cell area with a composite of thin, porous graphite material and a 316L stainless-steel foil 0.005 inches thick. The porous graphite is made in narrow strips and adhered to both sides of the metal foil with a 0.001 inch thick layer of electrically conductive adhesive silk screened onto the foil. Narrow channels are left between strips of the porous graphite to form gas distribution channels. The thickness of the porous graphite and the width of the open channels may be different on the two sides to accommodate different volumetric flow requirements of the hydrogen or fuel gas on the anode side, and the air or oxygen on the cathode side. This two-layer composite material serves all the functions and has all the required attributes of the machined graphite plates. Moreover, it has been found that 316L stainless steel does not contribute damaging metallic ions into the stack environment.

The present invention will therefore provide a significant reduction in stack height over the prior art by the use of thin components in place of machined-graphite bi-polar plates and by the use of thinner cooling plates. A significant reduction in weight will also accrue from these same components, and from the elimination of the heavy tie-bolts and clamping plates required in the prior art. Handling, location and assembly of the membrane into the stack will be greatly facilitated by capturing the membrane in a perimeter gasket. A reduction in manufacturing cost will by realized by capturing the membrane, forming the manifold passageways and creating all required sealing means concurrently in an injection-molding process, which is an inherently low-cost, high-volume production method.

BRIEF DESCRIPTION OF THE DRAWINGS

Further objects and advantages of the invention will become apparent from the following description and claims, and from the accompanying drawings, wherein:

FIG. 2A, 2B and 2C are a side view, a bottom view, and a cross-sectional view of a complete stack configuration and the stack housing of the present invention.

FIGS. 3A and 3B are plan views of the upper (anode) and lower (cathode) sides of the fuel cell separator of the present invention.

FIG. 5 is a plan view of the humidifier membrane assembly for fuel gas or hydrogen of the present invention.

FIGS. 5A and 5B are various cross-sectional views of the humidification cell of FIG. 5.

FIG. 6 is a plan view of the humidifier membrane assembly for air or oxygen gas of the present invention.

FIGS. 6A and 6B are various cross-sectional views of the humidification cell of FIG. 6.

FIG. 9 illustrates the progressive flow path for water, including the cooler plate, of the present invention.

FIG. 9A illustrates a portion of FIG. 9 in increased detail.

DETAILED DESCRIPTION OF THE PREFERRED EMBODIMENT

Figure 1A:
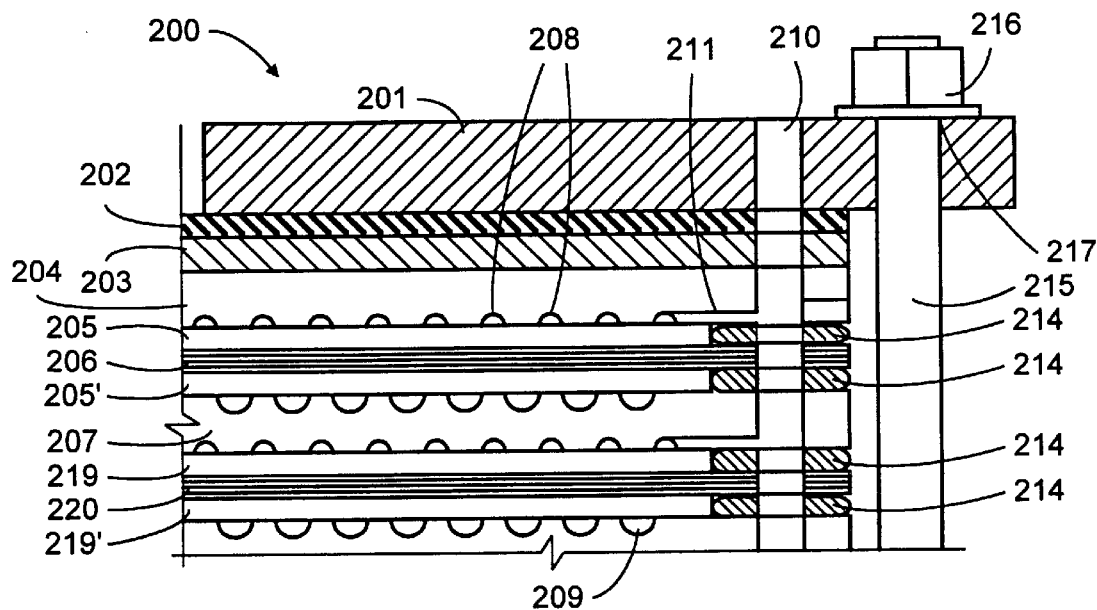
FIGS. 1A and 1B illustrate representative construction of a PEM fuel-cell stack employing the prior art.

Referring now to the drawings in detail wherein like numerals refer to like elements throughout the several views, one sees that FIG. 2C is a cross-sectional view of the design of the complete fuel cell stack 10 of the present invention. The stack housing 12 integrally surrounds the outer periphery of the fuel cell stack 10 and is made of fiberglass-reinforced, plastic-resin composite material. As shown in FIGS. 2A, 2B and 2C, the bottom portion 14 of stack housing 12 includes several manifold passageways—air inlet 16, hydrogen inlet 18, water inlet 20, water outlet 22, hydrogen outlet 24, air outlet 26—and positive and negative terminals 28, 30 with associated cables 32, 34, respectively. Negative terminal 30 is in electrical communication with lower current collector plate 36 while positive terminal 28 is in electrical communication with upper current collector plate 38 which has a conductive lead welded to it which passes down through one of the holes around the perimeter of the cell gaskets or through a channel molded as a protrusion on one wall of the stack housing 12, so that both electrical connections can be made at the same end of the stack.

Bottom portion 14 of stack housing 12 has a ribbed, reinforced platen to form a flat and rigid baseplate onto which the stack components can be clamped. The upper cover plate 40 of stack housing 12 is fixed in position, but with an upper platen 42 with a limited range of travel inwardly adjacent therefrom and a small air gap 44 therebetween, the size of air gap 44 being determined by the length of vertical travel of upper platen 42. The air gap 44 can be used in any of at least three ways to force upper platen 42 downward so as to compress the elements within fuel stack 10—the first way is to implement air gap 44 as an air actuated bladder, the second way is to implement upper platen 42 as a pneumatically actuated piston with an O-ring seal (i.e., further by injecting compressed air, typically at 150 psi, into air gap 44 so as to urge upper platen 42 downward) and the third way is to insert an array of downwardly-urging compression coil springs (not shown) into air gap 44.

Figure 1B:
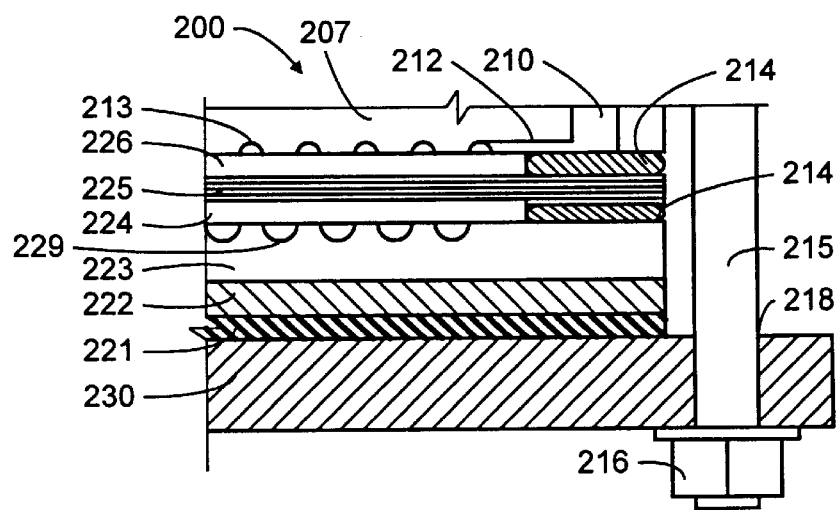

The upper cover plate 40 is secured to a flange formed on the walls of the stack housing 12, or by a resin-bonded joint between the upper cover plate 40 and the walls of the stack housing 12. The upper cover plate 40 supports the reaction force from the upper platen 42 and transfers this to the walls of the stack housing 12. The walls support the clamping force as a tensile load. The housing is thus made to serve the purpose of the tie-bolts in the prior art (see element 215 in FIGS. 1A and 1B).

The stack housing 12 contains and protects from damage all of the stack components; aligns the stack components one-to-the-other by virtue of all of the components fitting into the interior of the housing with close clearances; and applies compressive loading to clamp all stack components together to secure good electrical contact throughout the height of the stack, while providing electrical insulation between the anode and cathode electrical contacts of the stack.

The various elements of fuel stack 10 will be described with reference to the following figures in conjunction with FIGS. 2A, 2B, and 2C.

FIGS. 3A and 3B illustrate the fuel cell separator 46 which is a composite of thin, porous-carbon material and a 316L stainless steel foil 48 which is typically 0.005 inches thick and impermeable to hydrogen. The porous graphite is made in narrow strips 50 in a serpentine configuration and adhered to both the top or anode side 52 and the bottom or cathode side 54 of the metal foil 48 with typically a 0.001 inch thick layer of electrically-conductive adhesive silk-screened onto the foil 48. Narrow channels are left between the strips 50 of porous graphite to form serpentine gas-distribution channels 56, 58. The thickness of the porous graphite strips 50 and the width of the channels 56, 58 may be different on the anode and cathode sides 52, 54 to accommodate the different volumetric flow requirements of the air or oxygen on the cathode side 54, and the hydrogen or fuel gas on the anode side 52. This two-layer composite material serves all the functions and has the required attributes of the machined graphite plates of the prior art. It has been found that 316L stainless steel does not contribute damaging metallic ions into the stack environment.

Additionally, immediately inward from lower edge (as oriented in FIGS. 3A and 3B) 59 of fuel cell separator 46 is a row of apertures 60 for the vertical transmission of water or coolant through the fuel cell stack 10. Similarly, immediately inward from the right hand edge 61 of fuel cell separator 46 as shown in FIG. 3A (left hand edge of FIG. 3B) is a row of apertures 62, 62' for the vertical transmission of air or oxygen through the fuel cell stack 10 and immediately inward from the top edge 63 of fuel cell separator 46 as shown in FIGS. 3A and 3B is a row of apertures 64, 64' for the vertical transmission of hydrogen or fuel gas.

Figure 4:
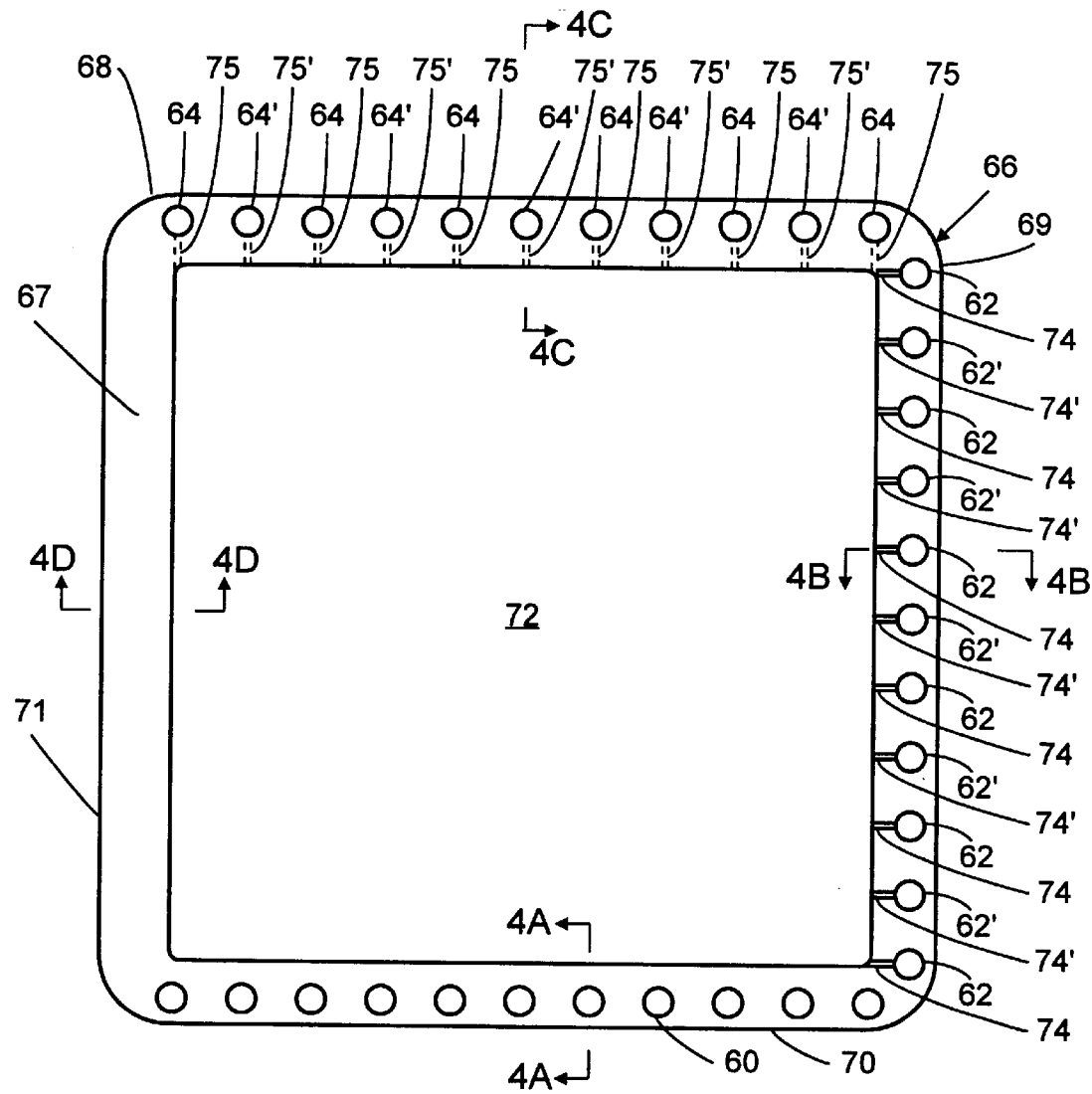
FIG. 4 is a plan view of the fuel cell membrane/gasket assembly of the present invention.

FIG. 4 is a top plan view of fuel cell membrane assembly 66 comprised of an elastomeric "picture frame" gasket 67 about the perimeter (formed by top edge 68, right hand edge 69, bottom edge 70 and left hand edge 71) surrounding a polymer membrane 72 in the square, central region. As shown in the cross-sectional views 4A, 4B, 4C and 4D, polymer membrane 72 is captured within the thickness of gasket 67 with a planar edge portion of polymer membrane 72 extending into gasket 67 with a planar portion of gasket 67 on both sides of the extending planar edge portion of polymer membrane 72. This configuration is achieved by injection molding the elastomeric material of gasket 67 around the edges of polymer membrane 72 during manufacture.

As shown in FIGS. 4A, 4B, 4C and 4D, polymer membrane 72 is not centrally located within the cross-sectional thickness of gasket 67, but rather the portion of the gasket 67 is thicker (typically 0.046 inches) on the upper or cathode side than on the lower or anode side (typically 0.023 inches).

As will be described hereinafter, the elastomeric "picture frame" gasket 67 of the fuel cell membrane assembly 66 (and similar elements described hereinafter) serves several functions:

1. grip the polymer membrane 72 and hold it taut in a semi-rigid frame to facilitate handling and assembly into the fuel cell stack 10;
2. form manifold passageways through the height of the fuel cell stack 10 and selectively distribute and collect fluids to and from the proper sides of each cell in the fuel cell stack 10, and to and from cooler and humidifier components within the fuel cell stack 10;
3. accomplish the sealing function around the perimeter of every cell, cooler and humidifier component in the fuel cell stack 10, as well as around every manifold passageway that passes through the fuel cell stack 10.

Inwardly from upper edge 68, right hand edge 69 and lower edge 70 are rows of apertures 64 (and 64'), 62 (and 62'), and 60, respectively, which vertically align with like elements of fuel cell separator 46 (see FIGS. 3A and 3B) to form manifold passageways to transmit hydrogen or fuel gas, air or oxygen, and water or coolant, respectively, through the fuel cell stack 10. Both inlet and outlet manifold passageways are formed and are in fluid communication with the appropriate inlets and outlets 16, 18, 20, 22, 24 and 26 (shown in FIGS. 2A and 2B).

Figure 4A:
FIGS. 4A, 4B, 4C and 4D are various cross-sectional views of the fuel cell membrane assembly of FIG. 4.
Figure 4B:
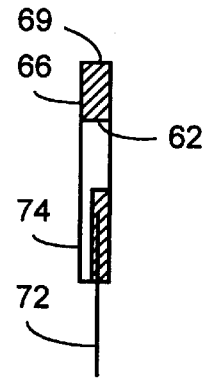
Figure 4C:
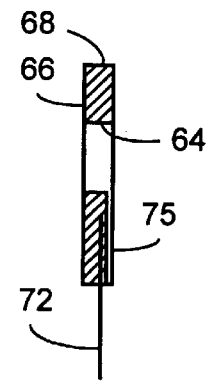
Figure 4D:

As shown in FIG. 4A, apertures 60 for the transmission of water or coolant pass through the gasket 67 with no interconnection to the cell area (i.e., polymer membrane 72). Likewise, as shown in FIGS. 4 and 4B, apertures 62, 62' (inlets and outlets, respectively) communicate with the upper (cathode) layer of polymer membrane 72 supplying air or oxygen thereto via horizontal flow channels 74 and 74' molded into the gasket 67. Horizontal flow channels 74 and 74' communicate the air or oxygen directly between the carbon strips 50 on the lower (cathode) side 54 of an upwardly adjacent fuel cell separator 46 as illustrated in FIG. 3B. As shown in FIGS. 4 and 4C, apertures 64, 64' (inlet and outlet) communicate with the lower (anode) layer of polymer membrane 72 supplying hydrogen or fuel gas thereto via horizontal flow channels 75, 75', respectively. Horizontal flow channels 75, 75' communicate hydrogen or fuel gas directly between the carbon strips 50 on the upper (anode) side 52 of a downwardly adjacent fuel cell separator 46 as illustrated in FIG. 3A. As shown in FIGS. 4 and 4D, left hand edge 71 of fuel cell membrane assembly 66 is solid and is free of manifold passageways.

FIG. 5 is a plan view of the humidifier water membrane assembly 76 or, alternately, a plan view of the humidifier hydrogen membrane assembly 78. The humidifier water membrane assembly 76 is oriented ninety degrees clockwise from the orientation shown in FIG. 5 while the humidifier hydrogen membrane assembly 78 is oriented ninety degrees counter-clockwise from the orientation shown in FIG. 5. Both the humidifier water membrane assembly 76 and the humidifier hydrogen membrane assembly 78 have a similar construction to fuel cell membrane assembly 66 as shown in FIG. 4 and the cross-sectional views thereof in that humidifier membrane assemblies 76, 78 comprise an elastomer "picture frame" gasket 79 with upper edge 81, right hand edge 82, bottom edge 83 and left hand edge 84 (all directions given with respect to illustrated orientation) surrounding and gripping polymer membrane 80. Again, this configuration is formed by injection molding with the polymer membrane 80 somewhat toward the lower side as shown in FIGS. 5A and 5B. Inwardly adjacent from upper edge 81 is a row of apertures 85. Likewise, inwardly adjacent from right hand edge 82 is a row formed from alternating apertures 86, 86' which, as discussed hereinafter, serve as inlets and outlets, respectively for the humidifier water membrane assembly 76 and the humidifier hydrogen membrane assembly 78.

Inwardly adjacent from bottom edge 83 is a row of apertures 87, and inwardly adjacent from left hand edge 84 is row of apertures 88. Apertures 86, 86' include horizontal flow channels 90, 90' providing fluid communication from the manifold passageways to the polymer membrane 80 and the surface facing thereto as described hereinafter.

Humidifier water membrane assembly 76 is oriented ninety degrees clockwise from the orientation of FIG. 5 so that apertures 86, 86' align with apertures 60 of FIGS. 3A, 3B and 4 thereby forming the water or coolant manifold passageways. Similarly, humidifier hydrogen membrane assembly 78 is oriented ninety degrees counter-clockwise from the orientation of FIG. 5 so that apertures 86, 86' align with apertures 64, 64' of FIGS. 3A, 3B and 4 thereby forming the hydrogen or fuel gas manifold passageways (see also, FIG. 8). Hydrogen gas enters via apertures 86' and horizontal passageways 90' and is distributed over the face of membrane 80 and recollected into the discharge passageways formed from apertures 86 and horizontal flow passageways 90. On the underside face of membrane 80, water is distributed. The water is supplied at a pressure somewhat higher than that of the hydrogen or fuel gas, and the membrane has the attribute under this condition of allowing water to flow through into the gas stream on the other side. Within the stack overall structure, hydrogen enters the humidification cells first, and then progresses to the electric current producing cells after being humidified.

FIG. 6 is a plan view of a humidifier oxygen membrane assembly 91 of similar construction as illustrated in FIGS. 4 and 5 comprising an elastomeric "picture frame" gasket 92 about the perimeter, formed by top edge 93, right hand edge 94, bottom edge 95 and left hand edge 96, surrounding a polymer membrane 97 in the square, central region. Rows of apertures 98, 99, 100, 101 are formed inwardly from edges 93, 94, 95, 96, respectively. As shown in FIGS. 6 and 6A, apertures 98 (and likewise 100) pass through gasket 92 with no communication to polymer membrane 97 while, as shown in FIGS. 6 and 6B, apertures 99, 101 include horizontal flow channels 102, 103 respectively to provide communication from an upper surface of polymer membrane 97 to the inlet and outlet oxygen or air flow manifolds, respectively. Humidifier oxygen membrane assembly 91 is used to humidify the oxidant gas (air or oxygen).

Figure 7:
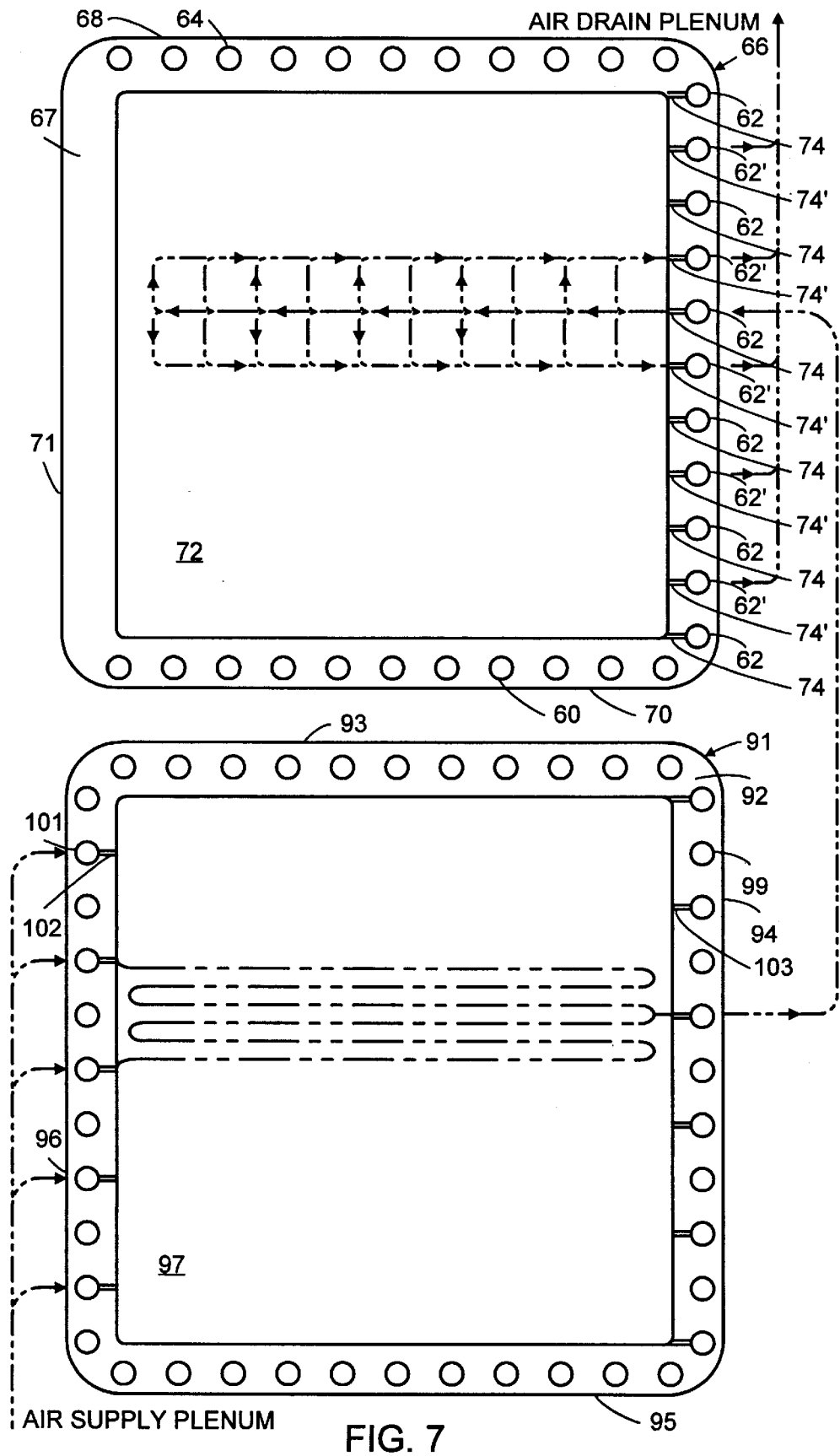
FIG. 7 illustrates the progressive flow path for air or oxygen gas through the stack of the present invention.

FIG. 7 illustrates the progressive flow path for air or oxygen gas through the fuel cell stack 10. Air or oxygen (from air inlet 16) enters the humidifier oxygen membrane assembly 91 via apertures 101 and horizontal flow channels 102, follows a serpentine path across the humidifying membrane 97 and exits via horizontal flow channels 103 and apertures 99 which form an air-distribution manifold passageway through which it flows to the upper face of fuel cell membrane assembly 66 via apertures 62 and horizontal flow channels 74. The air or oxygen gas flows through the channels 58 of porous graphite material 50 of the cathode (lower) side 54 of an upwardly adjacent fuel cell separator (see FIG. 3B) and exits through collection channels and manifold passageways formed from apertures 62' and horizontal flow channels 74', which carry the air to the exit 26 (see FIGS. 2A and 2B) of the fuel cell stack 10.

Figure 8:
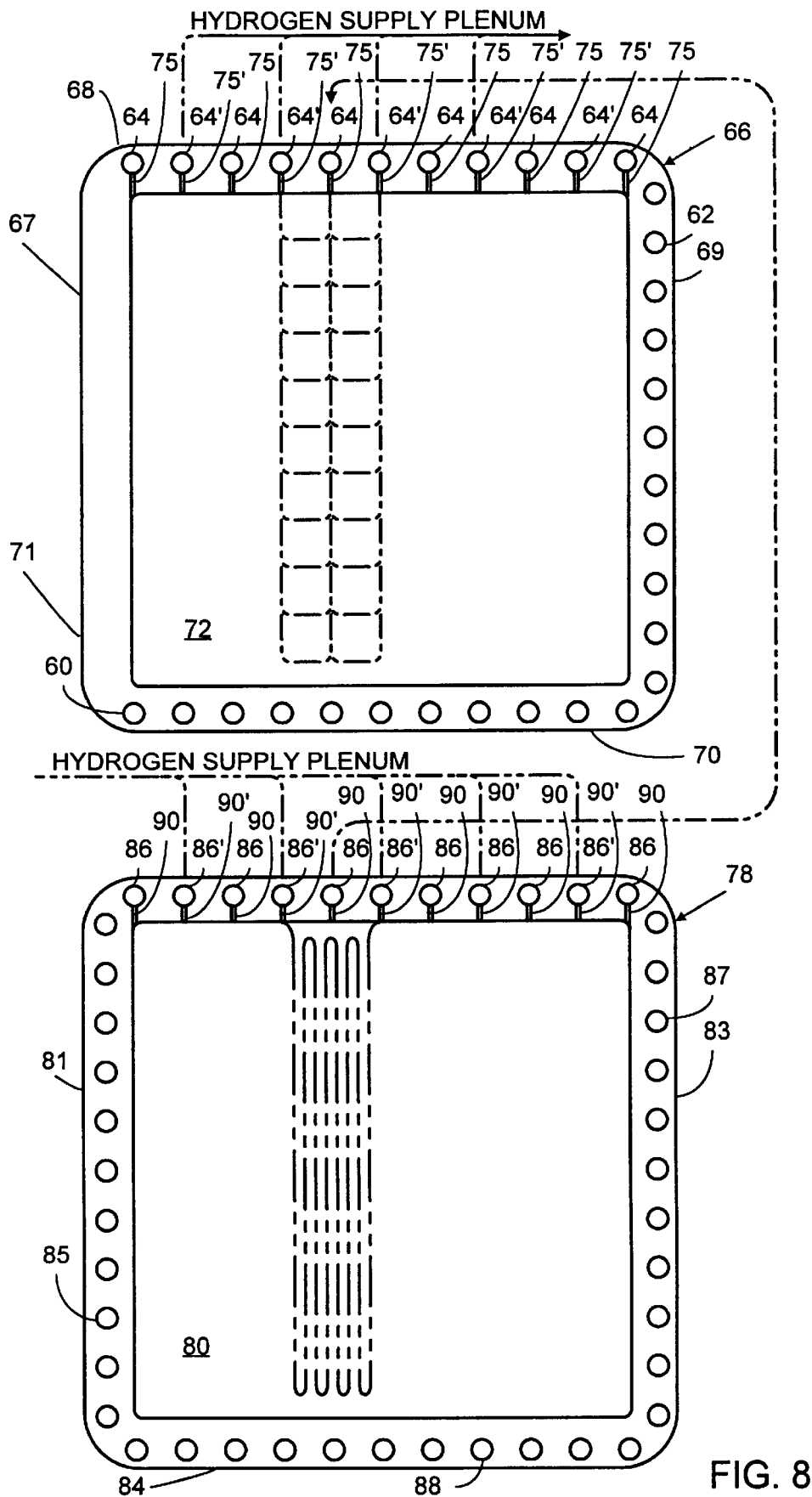
FIG. 8 illustrates the progressive flow path for hydrogen or fuel gas of the present invention.

Similarly, FIG. 8 illustrates the progressive flow path for hydrogen or fuel gas through the fuel cell stack 10. Hydrogen or fuel gas (from hydrogen inlet 18) enters the humidifier hydrogen membrane assembly 78 via apertures 86' and horizontal flow channels 90', follows a serpentine path across the humidifying membrane 80 and exits via horizontal flow channels 90 and apertures 86 which form a hydrogen-distribution manifold passageway through which hydrogen or fuel gas flows to a downward face of the fuel cell membrane assembly 66 via apertures 64 and horizontal flow channels 75. The hydrogen or fuel gas flows through the channels 56 of porous graphite material 50 of the anode (upper) side 52 of a downwardly adjacent fuel cell separator (see FIG. 3A) and exits through collection channels and manifold passageways formed from horizontal flow channels 75' and apertures 64', which carry the hydrogen or fuel gas to the exit 24 (see FIGS. 2A and 2B) of the fuel cell stack 10.

FIG. 9 illustrates the progressive flow path for water in the fuel cell stack 10. Water (from water inlet 20) enters humidifier water assembly 76 through apertures 86' and horizontal flow channel 90', flows across polymer membrane 80 and exits via apertures 86 and horizontal flow channels 90 which serve as outlets. The water then flows up to cooler plate 104 and enters through apertures 106 and horizontal flow channel 108 to cooling elements 112 with serpentine elements and exits via horizontal flow channels 108' and apertures 106' which lead to water outlet 22 (see FIGS. 2A and 2B)

As shown in FIGS. 2C and 9, cooler plates 104 enable the passage of a cooling fluid through the fuel cell stack 10 at selected locations to absorb and carry away the rejected heat generated by the cells due to their inefficiency. The cooler plates 104 are interposed between every other cell, or every third or fourth cell in the stack, depending on the heat load to be absorbed and the temperature gradient which can be allowed throughout the stack. The cooler plate 104 itself is a three layer sandwich of 316 stainless steel sheets. A central layer has serpentine flow channel formed within it through which the coolant fluid circulates over an area equal to that of the cells, communicating with the entry and exit holes around the perimeter mating with coolant manifold passageways in the cell gaskets on each side of this central layer is a cover layer of 0.005 inch thick stainless steel material. The three layers are secured together to seal the flow channels within the thickness of the plate, resulting in a near-zero electric resistance through the thickness of the plate assembly. Vacuum-furnace, high-temperature brazing or low-temperature brazing with induction heating with a "silver-solder" braze alloy is a typical method of joining these layers although those skilled in the art may use other methods. After the brazed assembly is completed, apertures are drilled around the perimeter to enable fluids to pass through the plate in the manifold passageways formed in the cell gaskets.

Referring back now to FIG. 2, the top of fuel cell stack 10 includes, sequentially starting from the top inwardly adjacent from upper platen 42, humidifier oxygen assembly 91, humidifier water assembly 76, humidifier hydrogen membrane assembly 78, humidifier oxygen assembly 91, and upper current collector plate 38. Fuel cells are formed from fuel cell membrane assemblies 66 separated by fuel cell separators 46. Cooler plates 104 are placed periodically along the fuel cell stack 10 with multiple sequential fuel cells therebetween.

In order to use fuel cell stack 10, the user supplies air or oxygen gas to inlet 16, hydrogen or fuel gas to inlet 18 and water to inlet 20, and provides for adequate collection and drainage from outlets 22, 24, 26. As stated previously, upper platen 42 is urged downwardly (by such methods as an air actuated bladder, a pneumatically actuated piston, an array of springs or other methods) to compress the various elements of the fuel cell stack 10 in order to assure secure electrical connections. Hydrogen or fuel gas is delivered to the anode side of the fuel cell membrane assemblies 66 and the downwardly adjacent anode (upper) sides 52 of fuel cell separators 46. The hydrogen is separated into hydrogen ions ($H^+$) and electrons ($e^-$). Likewise, air or oxygen gas is delivered to the cathode side of the fuel cell membrane assemblies 66 and the upwardly adjacent cathode (lower) sides 52 of fuel cell separators 46. The electrons traverse the electrical circuit of the load (not shown) on the fuel cell stack 10 while the hydrogen ions ($H^+$) pass through the polymer membrane 72 of the fuel cell membrane assemblies 66 and combine with the oxygen (and electrons which have traversed the electrical circuit) to form water on the cathode side of the fuel cell membrane assemblies 66. Cooling water (separate from the water formed by the chemical reaction at the cathode side of the fuel cell membrane) is delivered to the various cooler plates 104 to remove the waste heat.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A fuel cell stack comprising:

a plurality of cells including a membrane element with a cathode side and an anode side, sequential membrane elements being separated by fuel cell separator elements;

cooling plates interspersed within said plurality of cells;

means for delivering fuel gas to said anode side of said membrane element;

means for delivering oxygen-bearing gas to said cathode side of said membrane element;

means for delivering coolant to said cooling plates; and wherein said fuel cell separator elements are comprised of metallic foil and include a first series of strips of porous graphite or porous carbon material on a first side thereof facing a cathode side of a first adjacent membrane element and a second series of strips of porous graphite or porous carbon material on a second side thereof facing an anode side of a second adjacent membrane element.

2. The fuel cell stack of claim 1 wherein each of said membrane elements is supported by an elastomeric gasket with first passages leading to a cathode side thereof and second passages leading to an anode side thereof.

3. The fuel cell stack of claim 2 wherein said means for delivering oxygen-bearing gas to a cathode side of said membrane element includes said second passages wherein said means for delivering fuel gas to said anode side of said membrane element includes said second passages.

4. The fuel cell stack of claim 3 wherein said membrane elements, said fuel cell separator elements and said cooling plates are planar, and configured as a stack.

5. The fuel cell stack of claim 4 wherein said membrane elements, said fuel cell separator elements and said cooling plates are contained within a fiber-reinforced plastic resin shell.

6. The fuel cell stack of claim 5 further including means for humidifying fuel gas prior to delivering said fuel gas to said anode side of said membrane element.

7. The fuel cell stack of claim 6 further including means for humidifying oxygen-bearing gas prior to delivering said oxygen-bearing gas to said cathode side of said membrane element.

\* \* \* \* \*